US011805021B1

(12) United States Patent
Bansal et al.

(10) Patent No.: US 11,805,021 B1
(45) Date of Patent: Oct. 31, 2023

(54) NETWORK PATH RECOMMENDATIONS FOR SERVICES EXECUTING ON CLOUD PLATFORMS

(71) Applicant: Salesforce, Inc., San Francisco, CA (US)

(72) Inventors: Kaushal Bansal, Pleasanton, CA (US); Prabhat Singh, San Jose, CA (US); Amitabh Chakrabarty, Fremont, CA (US); Alankar Sharma, Moorestow, NJ (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/983,312

(22) Filed: Nov. 8, 2022

(51) Int. Cl.
*H04L 41/122* (2022.01)
*H04L 41/5041* (2022.01)

(52) U.S. Cl.
CPC ........ *H04L 41/122* (2022.05); *H04L 41/5045* (2013.01)

(58) Field of Classification Search
CPC ............... H04L 41/122; H04L 41/5045; H04L 12/5692; H04L 12/145; H04L 2012/562; H04L 45/76
See application file for complete search history.

(56) References Cited

U.S. PATENT DOCUMENTS

| | | | |
|---|---|---|---|
| 2011/0295956 A1* | 12/2011 | Pechanec | H04L 12/141 709/206 |
| 2012/0137021 A1* | 5/2012 | Chiueh | H04L 47/125 709/241 |
| 2016/0323177 A1* | 11/2016 | Tung | H04L 43/08 |
| 2018/0324083 A1* | 11/2018 | Caire | H04L 45/124 |
| 2019/0253339 A1* | 8/2019 | Mehmedagic | H04L 45/123 |

* cited by examiner

*Primary Examiner* — Muhammad Raza
(74) *Attorney, Agent, or Firm* — Fenwick & West LLP

(57) ABSTRACT

A network connectivity system identifies potential connection mechanisms between datacenter entities (e.g., between service instances) on the cloud platform. The network connectivity system provides recommendations including one or more connectivity paths that are preferred with respect to one or more indicators, for example, cost, latency, or security. Specifically, the network connectivity system receives a request to configure a network connection between a first service instance and a second service instance on the cloud platform. The first service instance and the second service instance may reside within the same or different datacenters, different geographical locations, and the like. A network connectivity system identifies, from network connectivity information, one or more connectivity mechanisms for establishing connection between a first datacenter entity (e.g., first service instance) and a second datacenter entity (e.g., second service instance).

15 Claims, 8 Drawing Sheets

NETWORK PATH RECOMMENDATIONS FOR SERVICES EXECUTING ON CLOUD PLATFORMS

BACKGROUND

FIELD OF ART

This disclosure relates to cloud computing platforms, and in particular to network connectivity between services executing on cloud computing platforms.

DESCRIPTION OF THE RELATED ART

Organizations are increasingly relying on cloud platforms (or cloud computing platforms) such as AWS (AMAZON WEB SERVICES), GOOGLE cloud platform, MICROSOFT AZURE, and so on for their infrastructure needs. Cloud platforms provide servers, storage, databases, networking, software, and so on over the interne to organizations. Conventionally, organizations maintained datacenters that housed the hardware and software used by the organization. However, maintaining datacenters can result in significant overhead in terms of maintenance, personnel, and so on. As a result, organizations are shifting their datacenters to cloud platforms that provide scalability and elasticity of computing resources. Organizations maintain cloud infrastructure on cloud platforms using continuous delivery platforms that can manage and deploy applications on cloud platforms.

A large-scale system, such as a multi-tenant system, may manage services for many organizations that are represented as tenants of the multi-tenant system and may interact with multiple cloud platforms. A multi-tenant system may have to maintain several thousand such datacenters on a cloud platform, and each datacenter may execute different services. Often, a service within a datacenter within the cloud platform may have to connect to another service in the same or different datacenter. For example, a service may have to retrieve data from the other service to complete a task, submit a query request to the other service, and the like. Typically, there may be multiple connectivity paths a service can connect to another service. However, since there are many (e.g., thousands) services deployed at one time on the cloud platform and the multi-tenant system may have a significant number (e.g., tens of thousands) of developers, it is difficult for service owners to be aware of certain connectivity paths and to navigate through the multi-tenant system to identify better options for connectivity.

Figure 1:
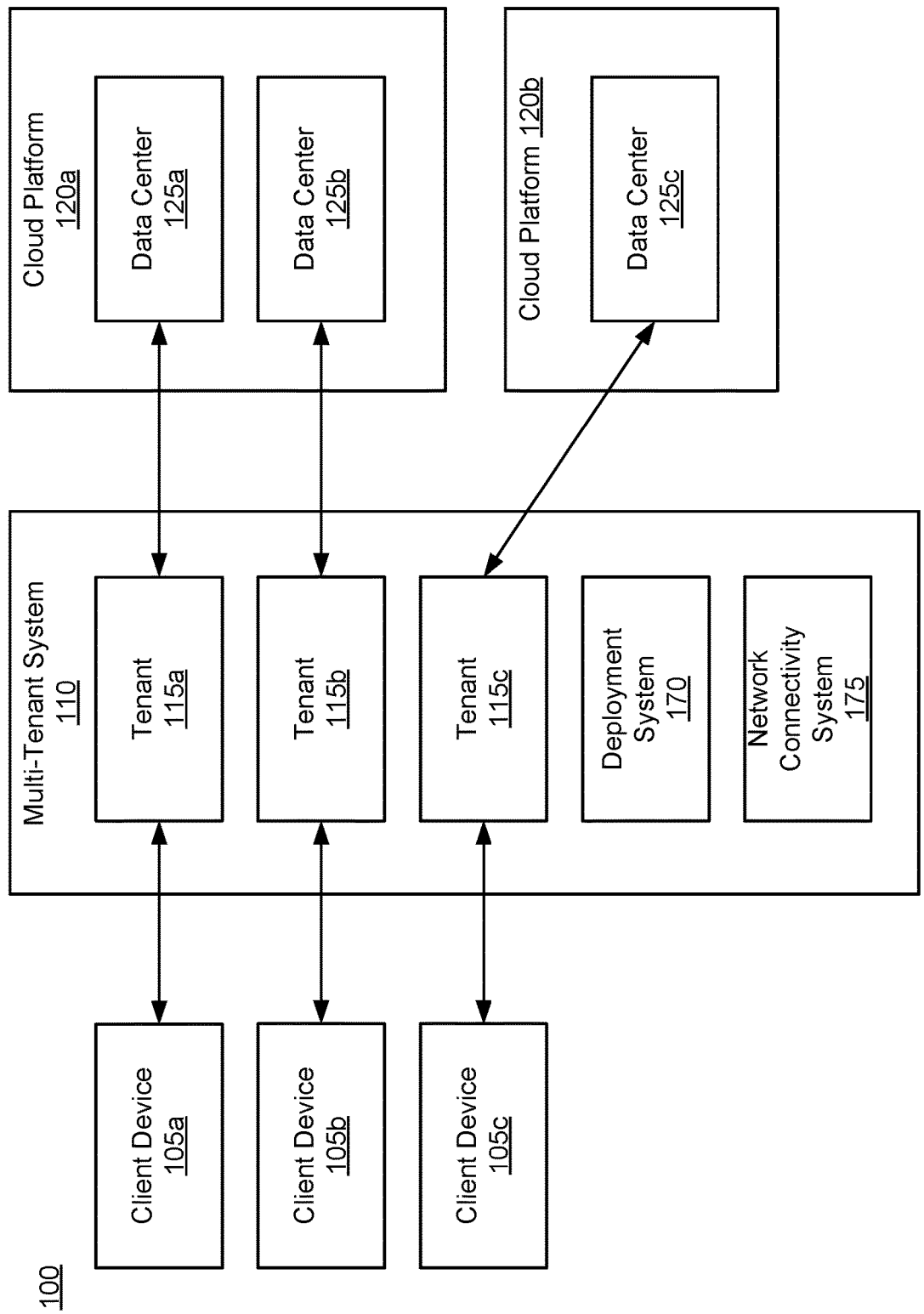
FIG. 1 is a block diagram of a system environment illustrating a multi-tenant system for configuring datacenters on cloud platforms, according to an embodiment.

The figures depict various embodiments for purposes of illustration only. One skilled in the art will readily recognize from the following discussion that alternative embodiments of the structures and methods illustrated herein may be employed without departing from the principles of the embodiments described herein.

The figures use like reference numerals to identify like elements. A letter after a reference numeral, such as "115*a*," indicates that the text refers specifically to the element having that particular reference numeral. A reference numeral in the text without a following letter, such as "115," refers to any or all of the elements in the figures bearing that reference numeral.

DETAILED DESCRIPTION

Cloud platforms provide computing resources, such as storage, computing resources, applications, and so on to computing systems on an on-demand basis via a public network such as internet. Cloud platforms allow enterprises to reduce upfront costs to set up computing infrastructure and also allow enterprises to get applications up and running faster with less maintenance overhead. Cloud platforms also allow enterprises to adjust computing resources to rapidly fluctuating and unpredictable demands. Enterprises can create a datacenter using a cloud platform for use by users of the enterprise. However, implementing a datacenter on each cloud platform requires expertise in the technology of the cloud platform.

In one embodiment, datacenters in a cloud platform are deployed using a cloud platform infrastructure language that is cloud platform independent. The system receives a declarative specification of a datacenter. The declarative specification describes the structure of the datacenter. The declarative specification is configured to generate the datacenter on any of a plurality of cloud platforms and is specified using a cloud platform infrastructure language. Each cloud platform independent declarative specification may include a hierarchy of datacenter entities, where each datacenter entity includes one or more of (1) a service or (2) one or more other datacenter entities. A "datacenter" or "datacenters" configured on a cloud platform may also be referred to herein as a virtual datacenter or a cloud-based datacenter. Similarly, a "datacenter entity" may also be referred to herein as a virtual datacenter entity or a cloud-based datacenter entity. A virtual datacenter or cloud-based datacenter may include one or more service groups or services.

The system receives information identifying a target cloud platform for creating the datacenter and compiles the declarative specification to generate a cloud platform specific datacenter representation. The system then sends the cloud platform specific datacenter representation and a set of instructions for execution on the target cloud platform. The target cloud platform executes instructions to configure the datacenter using the cloud specific datacenter representation. The system provides users with access to the computing resources of the datacenter configured by the cloud platform.

Embodiments also relate to a network connectivity system that identifies potential connection mechanisms between datacenter entities (e.g., between service instances) on the cloud platform. The network connectivity system provides recommendations including one or more connectivity paths that are preferred with respect to one or more indicators, for example, cost, latency, or security. Specifically, the network connectivity system receives a request to configure a network connection between a first service instance and a second service instance on the cloud platform. The first service instance and the second service instance may reside within the same or different datacenters, different geographical locations, and the like.

The network connectivity system identifies, from network connectivity information, one or more connectivity mechanisms for establishing connection between the first entity (e.g., first service instance) and the second entity (e.g., second service instance). In one example, the network connectivity information is represented as a connected graph, where each node represents a group of services ("service group") on the cloud platform and an edge to another node on the cloud platform represents a possible connection and mechanism for connection. In one embodiment, a connectivity mechanism includes connection through a L3 router, a forward proxy, a virtual private network (VPN), a platform specific tunnel (e.g., AWS PrivateLink), or a CDN Edge server. In one embodiment, the network connectivity information is obtained from the declarative specifications (or specifications derived therefrom) and/or security-as-code repositories that may include one or more network policies for configuring network services between services of the datacenters.

The network connectivity system obtains a respective cost estimate for the identified one or more connectivity mechanisms. In one instance, the cost estimate for a connective mechanism indicates the cost estimate of using the respective connectivity mechanism between the first datacenter entity and the second datacenter entity instance in terms of a monetary value. The cost estimate may, for example, depend on the estimated traffic that will flow between the entities, the standup cost for the connection, and the cost to serve. In one instance, the network connectivity system provides one or more recommended connectivity mechanisms for the request based on the cost estimates or one or more other indicators, such as security and latency of the connection.

A multi-tenant system may maintain several thousand such datacenters on the cloud platform, and each datacenter may execute different services. Even though there may be multiple ways of connecting services to one another, it is difficult for service owners to be aware of the different connectivity paths and to identify options that are cost-effective, security-effective, or have better latency. Since the datacenters are deployed using declarative specifications or security-as-code repositories that together include information on connectivity mechanisms and network restrictions between datacenter entities, the network connectivity system may take advantage of this information to generate the network connectivity information for the datacenter entities on the cloud platform, even as the entities dynamically change over time and new datacenters get created and existing datacenters are modified. In this manner, rather than defaulting to one connectivity option between a set of services, the network connectivity system can identify possible connectivity paths between the services and provide recommendations that are cost-effective and provide better connectivity with respect to one or more key indicators specified by the requestor.

SYSTEM ENVIRONMENT

FIG. 1 is a block diagram of a system environment 100 illustrating a multi-tenant system 110 for configuring datacenters on cloud platforms 120 according to an embodiment. The system environment 100 comprises a multi-tenant system 110, one or more cloud platforms 120, and one or more client devices 105. In other embodiments, the system environment 100 may include more or fewer components.

The multi-tenant system 110 stores information of one or more tenants 115. Each tenant 115 may be associated with an enterprise or other type of organization and may represent a customer of the multi-tenant system 110. For example, a tenant 115 may be an organization for which the multi-tenant system 100 stores customer relationship information and provides analytics on sales and marketing activity of the organization. Each tenant 115 may have multiple users that interact with the multi-tenant system 110 via client devices 105. The multi-tenant system 110 also includes various components for managing the infrastructure and provisioning resources on the cloud platform 120.

Within the multi-tenant system 110, data for multiple tenants 115 may be stored in a same physical database. However, the database is configured so that data of one tenant 115 is kept logically separate from that of other tenants 115 so that one tenant (e.g., tenant 115*a*) does not have access to another tenant's (e.g., tenant 115*b*) data, unless such data is expressly shared. It is known to tenants 115 that their data may be stored in a table that is shared with data of other customers. Accordingly, in a multi-tenant system 110, various elements of hardware and software may be shared by one or more tenants 115. For example, the multi-tenant system 110 may execute an application server that simultaneously processes requests for a number of tenants 115. However, the multi-tenant system 110 enforces tenant-level data isolation to ensure that jobs of one tenant 115 do not access data of other tenants 115.

The multi-tenant system 110 includes a deployment system 170. The deployment system 170 receives one or more declarative specifications from users for one or more datacenters 125 that each specify various entities of a respective datacenter 125. In one instance, the declarative specification of a datacenter 125 includes a hierarchical organization of datacenter entities, where each datacenter entity may include one or more services, one or more other datacenter entities, or a combination. The deployment system 170 receives the declarative specification and instantiates a datacenter 125 on the target cloud platform 120 according to the declarative specification. The deployment system 170 may also maintain security-as-code repositories that include one or more network policies for configuring network services between datacenter entities.

A tenant 115 or an entity of the multi-tenant system 110 may provide the deployment system 170 with a declarative specification for a datacenter 125 to be created on a target cloud platform 120 and to perform operations using the datacenter 125, for example, provision resources, perform software releases, and so on. Each tenant 115 may offer different functionality to users of the tenant 115, and thus, each tenant 115 may execute different types of services on the datacenter 125 configured for the tenant 115. A tenant 115 may further obtain or develop versions of software that include instructions for various services executing in the datacenter 125.

The multi-tenant system 110 further includes a network connectivity system 175. In one embodiment, the network connectivity system 175 identifies potential connection mechanisms between service instances on the cloud platform 120. The network connectivity system 175 provides recommendations including one or more connectivity paths that are preferred with respect to one or more key indicators, for example, cost, latency, or security. Specifically, the network connectivity system receives a request to configure a network connection between a first service instance and a second service instance on one or more cloud platforms 120. The first service instance and the second service instance may reside within the same or different datacenters 125, geographical locations, and the like.

The network connectivity system 175 identifies, from network connectivity information, one or more connectivity mechanisms for establishing connection between a first datacenter entity (e.g., first service instance) and a second datacenter entity (e.g., second service instance). In one example, the network connectivity information is represented as a connected graph, where each node represents a group of services ("service group") on the cloud platform and an edge to another node on the cloud platform represents a possible connection and mechanism for connection. In one embodiment, a connectivity mechanism includes connection through a L3 router, a forward proxy, a virtual private network (VPN), a platform specific tunnel (e.g., AWS PrivateLink), or a CDN Edge server. In one embodiment, the network connectivity information is obtained from the declarative specifications (or specifications derived therefrom) or security-as-code repositories that may include one or more network policies for configuring network services between services of the datacenters 125.

Responsive to receiving the request, the network connectivity system 175 obtains a respective cost estimate for the identified one or more connectivity mechanisms. In one instance, the cost estimate for a connective mechanism indicates the cost estimate of using the respective connectivity mechanism between the first entity and the second entity with respect to an estimated monetary value. The cost estimate may, for example, depend on the estimated traffic that will flow through the services, the standup cost for the connection, and the cost to serve the connection. In one instance, the network connectivity system provides one or more recommended connectivity mechanisms for the request based on the cost estimates or one or more other indicators, such as security and latency of the connection. For example, the user of the request may provide an indication that latency is more important than security, and the network connectivity system 175 may provide recommended connectivity paths that are selected by weighting latency requirements with higher relative importance than security requirements.

The multi-tenant system 110 may maintain several thousand such datacenters on the cloud platform, and each datacenter may execute different services. Even though there may be multiple ways of connecting services to one another, it is difficult for service owners to be aware of the different connectivity paths and to identify options that are cost-effective, security-effective, or have better latency. Since the datacenters 125 are deployed using declarative specifications or security-as-code repositories that together include information on connectivity mechanisms between datacenter entities, the network connectivity system 175 may take advantage of this information to generate the network connectivity information for the datacenter entities on the cloud platform 120, even as the entities dynamically change over time and new datacenters get created and existing datacenters are modified. In this manner, rather than defaulting to one connectivity option between a set of services or having to manually navigate through and configure the required connections, the network connectivity system 175 can automatically identify possible connectivity paths between the services and provide recommendations that are cost-effective and provide better connectivity with respect to one or more indicators specified by the requestor.

The cloud platform 120 may also be referred to as a cloud computing platform or a public cloud environment. Examples of cloud platforms 120 include AWS (AMAZON web services), GOOGLE cloud platform, or MICROSOFT AZURE. A cloud platform 120 offers computing infrastructure services that may be used on demand by a tenant 115 or by any computing system external to the cloud platform 120. Examples of the computing infrastructure services offered by a cloud platform 120 include servers, storage, databases, networking, security, load balancing, software, analytics, intelligence, and other infrastructure service functionalities. These infrastructure services may be used by a tenant 115 to build, deploy, and manage applications in a scalable and secure manner.

A datacenter 125 in a cloud platform 120 represents a set of computing resources including servers, applications, storage, memory, and so on that can be used by users, for example, users associated with the tenant 115. A datacenter 125 described herein refers to a virtual datacenter or a cloud-based datacenter (rather than a physical datacenter) and may be a trusted public-cloud environment that includes the requirements for service groups (described in conjunction with FIG. 3) to be instantiated. In one embodiment, a datacenter 125 may have a specific environment type (e.g., production, testing, stage) designating the purpose of the datacenter 125. Datacenters 125 of different environment types may be differentiated by their capabilities, limitations, operator access, customer access, and level of support, and the like. A datacenter 125 may be designed to be deployed in a single region on a specific substrate.

The computing resources of a datacenter 125 are secure and may not be accessed by users that are not authorized to access them. For example, a datacenter 125a that is created for users of tenant 115a may not be accessed by users of tenant 115b unless access is explicitly granted for the user. Similarly, datacenter 125b that is created for users of tenant 115b may not be accessed by users of tenant 115a, unless access is explicitly granted.

Each component shown in the system environment 100 of FIG. 1 represents one or more computing devices. A computing device can be a conventional computer system executing, for example, a Microsoft™ Windows™-compatible operating system (OS), Apple™ OS X, and/or a Linux distribution. A computing device can also be a client device having computer functionality, such as a personal digital assistant (PDA), mobile telephone, video game system, etc. Each computing device stores software modules storing instructions. The interactions between the various components of the system environment 100 are typically performed via a network, not shown in the system environment 100 of FIG. 1. In one embodiment, the network uses standard communications technologies and/or protocols. In another embodiment, the entities can use custom and/or dedicated data communications technologies instead of, or in addition to, the ones described above.

Although the techniques disclosed herein are described in the context of a multi-tenant system with multiple tenants, the techniques can be implemented using other systems that may not necessarily be multi-tenant systems. For example, an online system used by a single organization or enterprise may use the techniques disclosed herein to create one or more virtual or cloud-based datacenters on one or more cloud platforms.

SYSTEM ARCHITECTURE OF DEPLOYMENT SYSTEM

Figure 2:
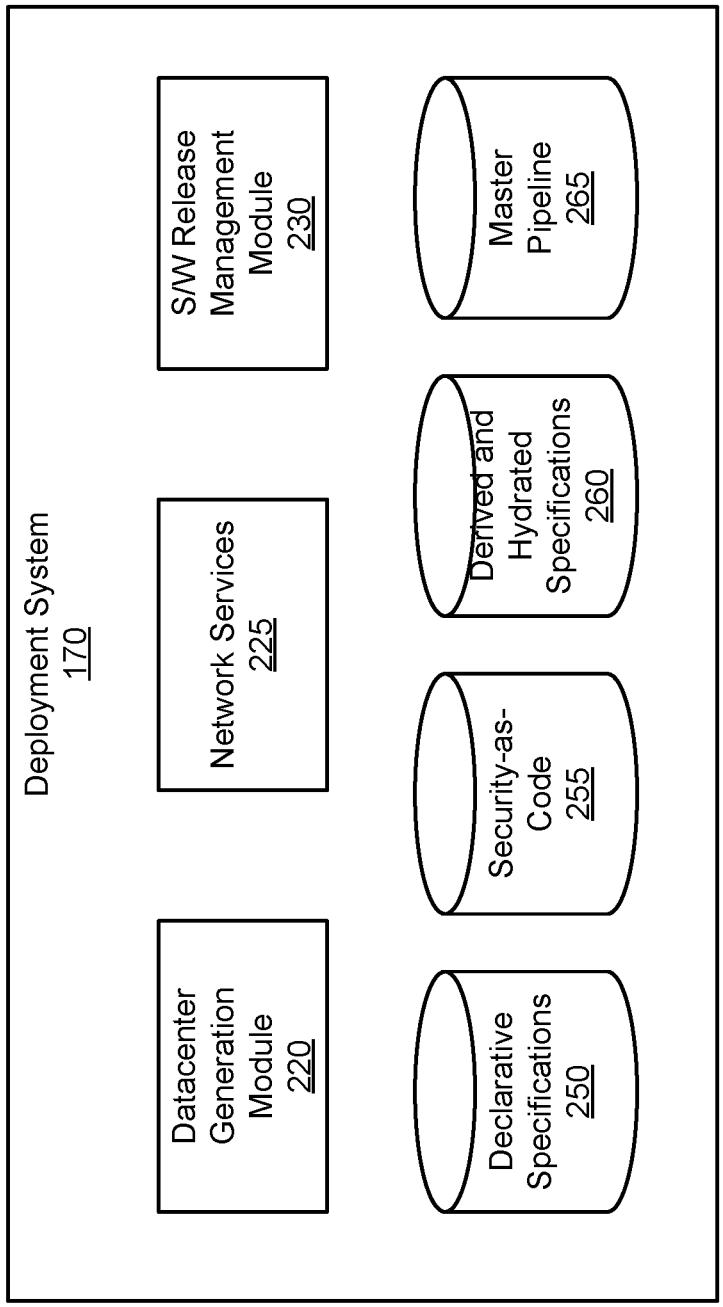
FIG. 2 is a block diagram illustrating a system architecture of a deployment module of the multi-tenant system, according to an embodiment.

FIG. 2 is a block diagram illustrating a system architecture of a deployment system 170 of the multi-tenant system 110, according to an embodiment. In one embodiment, the deployment system 170 includes a datacenter generation module 220, network services 225, and a software release management module 230. The deployment system 170 also includes a declarative specifications store 250, a security-as-code store 255, a derived and hydrated specifications store 260, and a master pipeline store 265. Other embodiments can have different and/or other components than the ones described here, and that the functionalities can be distributed among the components in a different manner.

The datacenter generation module 220 includes instructions for creating datacenters 125 on the cloud platform 120. The datacenter generation module 220 receives from users a cloud platform independent declarative specification of a datacenter 125. The cloud platform independent declarative specifications of different datacenters 125 may be stored in the declarative specifications store 250. Specifically, a declarative specification of a datacenter 125 specifies various entities of the datacenter 125. In an embodiment, declarative specification of a datacenter 125 includes a hierarchical organization of datacenter entities, where each datacenter entity may include one or more services, one or more other datacenter entities, or a combination of both. The datacenter generation module 220 receives the declarative specification for a datacenter and a target cloud platform as input and generates a cloud platform specific metadata representation for the target cloud platform.

Figure 3:
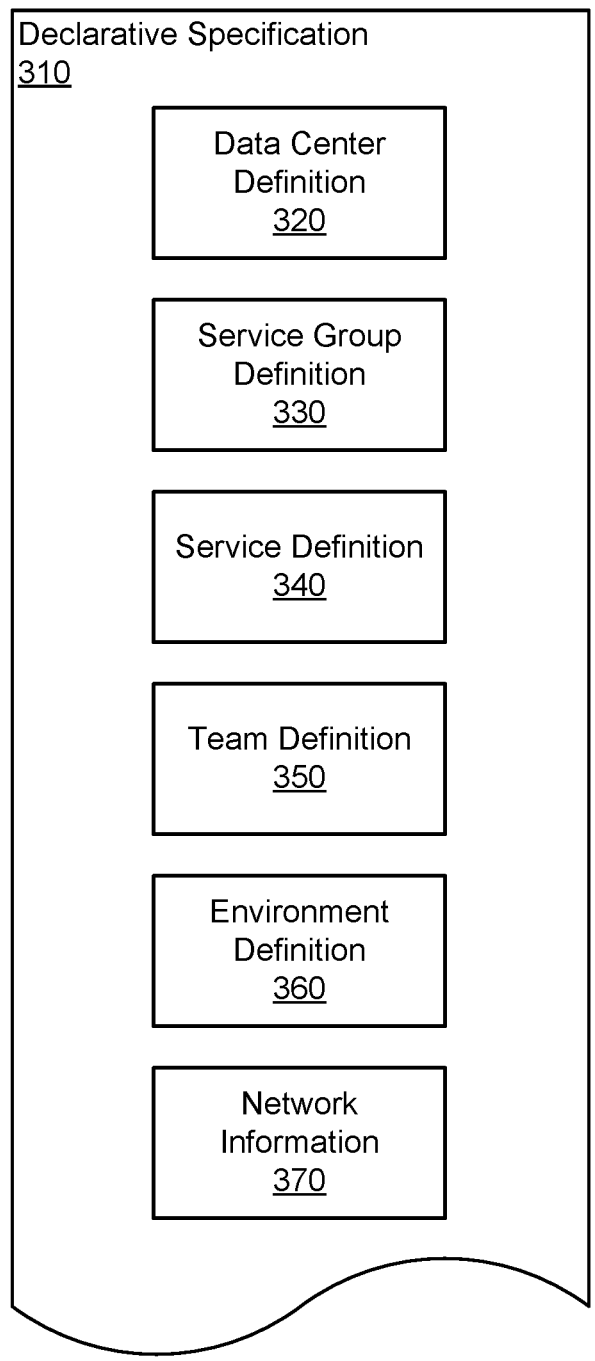
FIG. 3 illustrates an example of a declarative specification of a datacenter, according to one embodiment.

FIG. 3 illustrates an example of a declarative specification 310 of a datacenter 125 according to one embodiment. The declarative specification 310 includes multiple datacenter entities. A datacenter entity is an instance of a datacenter entity type and there can be multiple instances of each datacenter entity type. Examples of datacenter entities include datacenters, service groups, services, teams, environments, and schemas.

The declarative specification 310 includes definitions of various types of datacenter entities including a datacenter, a service group, a service, a team, an environment, and network information. The following is a description of various types of datacenter entities and their examples. The examples are illustrative and show some attributes of the datacenter entities, but embodiments are not limited hereto. Other embodiments may include different attributes and an attribute with the same functionality may be given a different name than that described herein. In an embodiment, the declarative specification 310 is specified using hierarchical objects, for example, JSON (Javascript object notation) that conform to a predefined schema.

A datacenter definition 320 specifies the attributes and components of a datacenter instance. As described above, a datacenter instance herein may refer to a virtual datacenter instance or a cloud-based datacenter instance that is an environment within a cloud platform. A declarative specification 310 may specify multiple datacenter instances. The datacenter definition 320 specifies attributes including a name, description, a type of environment, a set of service groups, teams, domain name servers for the datacenter 125, and so on. A datacenter definition 320 may specify a schema definition and any metadata representation generated from the datacenter definition 320 is validated against the specified schema definition. A datacenter 125 includes a set of core services and capabilities that enable other services to function within the datacenter 125. An instance of a datacenter is deployed in a particular cloud platform 120 and may be associated with a particular environment type. As an example, the environment type may be one of a development, testing, staging, or production environment.

Following is an example definition 320 of a datacenter instance. The datacenter definition 320 includes a list of service groups included in the datacenter instance and other attributes including an environment of the datacenter, a datacenter identifier, a name, a region representing a geographical region, one or more teams associated with the datacenter, and a schema version.

```
{
    "datacenter_instance": {
        "environment": "env1",
        "datacenter_instance_identifier": "id1",
        "name": "data_center1",
        "region": "region1",
        "service_groups": [
            "service_group1",
            "service_group2",
            "service_group3",
            "service_group4",
            ...
        ],
        "schema_version": "1.0",
        "admin_team": "admins",
```

A service group definition 330 represents a set of capabilities and features and services offered by one or more computing systems that can be built and delivered independently, in accordance with one embodiment. A service group may be also referred to as a logical service group, a functional unit, or a bounded context. A service group may also be viewed as a set of services of a set of cohesive technical use-case functionalities offered by one or more computing systems. A service group enforces security boundaries. A service group defines a scope for modifications. Thus, any modifications to an entity, such as a capability, feature, or service offered by one or more computing systems within a service group may propagate as needed or suitable to entities within the service group but does not propagate to an entity residing outside the bounded definition of the service group.

A datacenter may include multiple service groups. A service group definition 330 specifies attributes including a name, description, an identifier, schema version, and a set of service instances. An example of a service group is a blockchain service group that includes a set of services used to providing blockchain functionality. Similarly, a security service group provides security features. A user interface service group provides functionality of specific user interface features. A shared document service group provides functionality of sharing documents across users. Similarly, there can be several other service groups.

Service groups support reusability of specification so that tenants 115 or users interested in developing a datacenter 125 have a library of service groups that they can readily use. The boundaries around services of a service group are based on security concerns and network concerns among others. A service group is associated with protocols for performing interactions with the service group. In an embodiment, a service group provides a collection of API's (application programming interfaces) and services that implement those API's. Furthermore, service groups are substrate independent. A service group may provide a blast radius scope for the services within the service group so that any failure of a service within the service group has impact limited to services within the service group and has minimal impact outside the service group.

Following is an example of a specification of a service group definition 330. The service group definition 330 specifies various attributes representing metadata of the service group and includes a set of services within the service group. There may be other types of metadata specified for a service group, not indicated herein.

```
{
  "service group": [
    {
      "cells": [ ],
      "description": "Service group Service Instance Definitions",
      "service_group_id": "id1",
      "name": "name1"
      "schema_version": "1.0",
      "cluster_instances": [
        {
              "cluster_instance_name": "cluster1",
              "cluster_type": "cluster_type1"
        },
        {
              "cluster_instance_name": " cluster2",
              "cluster_type": " cluster_type1"
        },
        {
              "cluster_instance_name": " cluster3",
              "cluster_type": " cluster_type2"
        }
      ],
      "service_instances": [
        {
              "service_instance_name": "serviceinstance0001",
              "service_type": "servicetype1"
        },
        {
              "service_instance_name": "serviceinstance0002",
              "service_type": " servicetype1"
              "cluster_instance": "cluster1"
        },
        {
              "service_instance_name": "serviceinstance0003",
              "service_type": " servicetype2"
        },
        ...
      ],
      "service_teams": ["team1"] ,
      "type": "servicetype"
      "security_groups": [
        {
              "name": "group1",
              "policies": [
                {
                  "description": "Allow access from site S1",
                  "destination" : { "groups" : [ "group2" ] } ,
                  "environments" : ["dev", "test", "staging" ],
                  "source": {
                    "iplist": "URL1",
                    "filters": [ filter-expression ]
```

As shown in the example above, a service group definition 330 may specify a set of clusters. A cluster represents a set of computing nodes, for example, a set of servers, a set of virtual machines, or a set of containers (such as KUBERNETES containers). A physical server may run multiple containers, where each container has its own share of filesystem, CPU, memory, process space, and so on.

The service group definition 320 also specifies a set of services. A service group definition 330 may specify a cluster for a service so that the datacenter 125 deployed on a cloud platform 120 runs clusters of computing nodes and maps the services to clusters based on the specified mapping if included in the declarative specification 310. For example, in the service group definition 330 example shown above, the service instance serviceinstance0002 is specified to run on cluster instance cluster1 .

The service group definition 320 may also specify security groups, each security group specifying a set of services that are allowed to interact with each other. Services outside the security group are required to pass additional authentication to communicate with services within the security group. Alternatively, the services within a security group use one protocol to interact with each other and services outside the security group use a different protocol that requires enhances authentication to interact with services within the security group. Accordingly, a security group specifies policies that determine how services can interact with each other. A security policy may specify one or more environments for which the security policy is applicable. For example, a security policy policy1 may apply to a particular environment env1 (e.g., production environment) and another security policy policy2 may apply to another environment env2 (e.g., development environment). A security policy may be specified for a service group type or for a specific service type.

In an embodiment, the security policy specifies expressions for filtering the service groups based on various attributes so that the security policy is applicable to the filtered set of service groups. For example, the security policy may specify a list of IP (internet protocol) addresses that are white-listed for a set of service groups identified by the filtered set and accordingly these computing systems are allowed access to the service group or to specific set of services within the service group. In an embodiment, a security policy may specify for a service group, a set of source services and a set of destination services. The source services for a particular service specify the services outside the security group that are allowed to connect with this particular service. The destination services for a particular service specify the services outside the security group that this particular service needs to connect to.

A service definition 340 specifies metadata for a type of service, for example, database service, load balancer service, and so on. The metadata be describe various attributes of a service including a name of the service, description of the service, location of documentation for the service, any sub-services associated with the service, an owner for the service, a team associated with the service, build dependencies for the service specifying other services on which this service depends at build time, start dependencies of the service specifying the other services that should be running when this particular service is started, authorized clients, DNS (domain name server) name associated with the service, a service status, a support level for the service, and so on. The service definition 340 may specify listening ports attribute specifying the ports that the service can listen on for different communication protocols, for example, the service may listen on a port p1 for UDP protocol and a port p2 for TCP protocol. Other services within the datacenter 125 can interact with a service via the ports specified by the service.

The service definition 340 specifies an attribute outbound access that specifies destination endpoints, for example, external URL's (uniform resource locators) specifying that the service needs access to the specified external URL's. The outbound access specification may identify one or more environment types for the service for which the outbound access is applicable. For example, an outbound access for a set of endpoints S1 may apply to a particular environment env1 (e.g., production environment) and outbound access for a set of endpoints S2 may apply to another environment env2 (e.g., development environment).

Following is an example of a service definition.

```
{
    "service definition": [
        {
            "authorized_clients": [ ],
            "build_dependencies": [ ],
            "description": "description of service",
            "dns_name": "dns1",
            "documentation": "URL",
            "name": "name1",
            "namespace": "space1",
            "service_owner": "user1",
            "service_status": "GA",
            "service_team": "team1",
            "support_level": "STANDARD",
            "start_dependencies": ["svc5", "svc7", ...] ,
            "sub_services": [ "service1", " service2", " service3", ...],
            "listening ports": [
                { "protocol": "tcp", "ports": [ "53" ] },
                { "protocol": "udp", "ports": [ "53" ] }
            "outbound_access": [
                {
                    "destination": [
                    {
                    "endpoints" : [ ".xyz.com:443", ".pqr.com:443" ]
                    }
```

A team definition 350 includes team member names and other attributes of a team. For example, the attributes may include name, email, communication channel and so on. A service may be associated with one or more teams that are responsible to modifications made to that service. Accordingly, any modification made to that service is approved by the team. A service may be associated with a team responsible for maintenance of the service after it is deployed in a cloud platform 120. A team may be associated with a service group and is correspondingly associated with all services of that service group. For example, the team may approve any changes to the service group, for example, services that are part of the service group. A team may be associated with a datacenter 125 and is accordingly associated with all service groups within the datacenter 125. A team association specified at a datacenter level provides a default team for all service groups within the datacenter and may further provide a default team for all services within the service groups.

In one embodiment, a team association specified at the functional level overrides the team association provided at the datacenter level. Similarly, a team association specified at the service level overrides the default that may have been provided by a team association specified at the service group level or a datacenter level. A team can decide how certain actions are taken for the datacenter entity associated with the team. The team associations can also determine the number of accounts on the cloud platform that are created for generating the final metadata representation of the datacenter 125 for a cloud platform 120 by the compiler and for provisioning and deploying the datacenter 125 on a cloud platform 120. The datacenter generation module 220 creates one or more user accounts in the cloud platform 120 and provides access to the team members to the user accounts. Accordingly, the team members are allowed to perform specific actions associated with the datacenter entity associated with the team, for example, making or approving structural changes to the datacenter entity or maintenance of the datacenter entity when it is deployed including debugging and testing issues that may be identified for the datacenter entity.

An environment definition 360 specifies a type of system environment represented by the datacenter 125, for example, development environment, staging environment, test environment, or production environment.

The network information 370 defines network boundaries of a datacenter and entities of the datacenter and specifies a set of access entities from which resources of the datacenter 125 can be accessed from. In one embodiment, the declarative specification 310 specifies one or more VPC networks within the datacenter 125 that are each an on-demand pool of shared resources allocated within one or more datacenter entities and provide a level of isolation between the users using the resources. For example, a service group may include multiple VPC networks. Each VPC network may be identified via a VPC identifier (ID). A VPC network may include one or more subnets, and each subnet is a range of IP addresses within a VPC. Similarly, each subnet may be identified via a subnet ID. For example, a VPC network may include a public subnet and a private subnet, where instances in the public subnet can connect to the internet but instances in the private subnet cannot. In one instance, a public subnet may include a Network Address Translation (NAT) gateway that forwards traffic from instances in the private subnet to the internet or other entities of the cloud platform 120 and sends back a response to the instance.

Returning to FIG. 2, the network services 225 is a collection of services that creates and manages connectivity options for datacenter entities on the cloud platform 120. In one embodiment, the network connectivity is configured based on the declarative specification. The network services 225 use cloud platform specific features and network functionality, such that the security policies and communication protocols for datacenter entities in the declarative specification are implemented and established. The network services 225 may manage a set of configurations for the connectivity mechanisms and also store in the security-as-code datastore 255, network policies for the services that provide, for example, a set of rules for restricting the inflow and outflow of traffic. For example, the security-as-code datastore 255 may store network policies including firewall policies, VPN policies, and the like.

Thus, there may be a predetermined number of ways for a particular service instance to connect to another service instance, depending on the collection of services supported by network services 225 and any restrictions between connectivity between datacenter entities that are specified in the declarative specifications for the datacenters. In one embodiment, one connectivity mechanism is through a Layer 3 (L3) router when the first service instance and the second service instance are in the same IP space. Another connectivity mechanism may be through a public proxy, such as a forward proxy or a reverse proxy, that goes through the Internet. Another connectivity mechanism is a virtual private network (VPN) that provides a secure end-to-end tunnel between the first service and the second service. Another connectivity mechanism is through a public cloud platform specific tunnel, such as AWS PrivateLink for connecting the first service and the second service through cloud-specific connectivity. Another connectivity mechanism is a content delivery network (CDN) for caching and locality. However, embodiments are not limited hereto, and any other connectivity mechanism that connects datacenter entities in a cloud platform 120 may be included. In one embodiment, the multi-tenant system 110 includes a dedicated service for managing and configuring each of these connectivity mechanisms for the datacenters 125 on the cloud platform 120.

Returning to FIG. 2, the datacenter generation module 220 may process the declarative specifications to generate derived specifications for the datacenters 125. The derived specifications define details of each instance of a datacenter 125 specified in the declarative specification. For example, the datacenter generation module 220 creates unique identifiers for datacenter entity instances such as service instances. In an embodiment, the derived specification includes an array of instances of datacenter entity types, for example, an array of service group instances of a particular service group type. Each service group instance includes an array of service instances. A service instance may further include the details of a team of users that are allowed to perform certain actions associated with the service instance. The details of the team are used during provisioning and deployment by the datacenter generation module 220, for example, for creating a user account for the service instance and allowing members of the team to access the user account.

The derived specification includes attributes of each instance of a datacenter entity. Accordingly, the description of each instance of a datacenter entity is expanded to include all details. As a result, the derived specification of a data center may be significantly larger than the cloud-platform independent declarative specification. For example, while the declarative specification may be few thousand lines of specification, the derived specification may be several hundred thousands of lines of code. As a result, the datacenter generation module 220 keeps the derived specification as immutable, i.e., once the representation is finalized, no modifications are performed to the representation. For example, if any updates, deletes, or additions of data center entities need to be performed, they are performed on the cloud platform independent declarative specification.

The datacenter generation module 220 receives a target cloud platform on which the datacenter 125 is expected to be provisioned and generates a hydrated specification of the datacenter 125. For example, the datacenter generation module 220 interacts with the target cloud platform to generate certain entities (or resources), for example, user accounts, VPC's, and networking resources such as the subnets on the VPC's, connections between entities in the cloud platform 120, and so on. The datacenter generation module 220 receives resource identifiers of resources that are created in the target cloud platform, for example, user account names, VPC ID's, and so on, and incorporates the identifiers in the derived specification to obtain the hydrated specification of the data center. Thus, the various connectivity mechanisms between datacenter entities may be available as part of the hydrated specification.

The datacenter generation module 220 stores the derived specifications and the hydrated specifications in the derived and hydrated specifications datastore 260. The datacenter generation module 220 deploys the cloud platform specific hydrated specification on the specific target cloud platform 120 for which the representation was generated. The datacenter generation module 220 may perform various validations using the generated metadata representations, including policy validations, format validations, and so on.

The software release management module 230 manages software releases for various services or applications running on the datacenters 125 created by the datacenter generation module 220. The software release management module 230 receives as inputs an artifact version map (not shown) and a master pipeline 265. The artifact version map identifies specific versions of software releases or deployment artifacts targeted for deployment on specific datacenter entities. The artifact version map maps datacenter entities to software release versions that are targeted to be deployed on the datacenter entities. The master pipeline 265 includes instructions for operations related to software releases on the datacenter 125, for example, deployment of services, destroying services, provisioning resources for services, destroying resources for services, and so on.

The master pipeline 265 may include instructions for performing operations related to software releases for environments such as development environment, test environment, canary environment, and production environment, and instructions for determining when a software release is promoted from one environment to another environment. For example, if the deployments of a software release in a development environment execute more than a threshold number of successful test cases, the software release is promoted to a test environment for further testing, for example, system level and integration testing. If the software release in a test environment passes a threshold of test coverage, the software release is promoted to a canary environment where the software release is provided to a small subset of users on a trial basis. If the software release in a canary environment executes without errors for a threshold time duration, the software release is promoted to production environment where the software release is provided to all users.

The software release management module 230 compiles an input artifact version map and the master pipeline 265 to generate a cloud platform specific detailed pipeline that is transmitted to the target cloud platform. The cloud platform specific detailed pipeline includes instructions for deploying the appropriate version of a software release or deployment artifact on the datacenter entities as specified in the artifact version map. The software release management module 230 may receive modifications to one of the inputs. For example, a user may modify the input artifact version map and provide the same master pipeline 265. Accordingly, the same master pipeline is being used but different software releases are being deployed on datacenter entities. The software release management module 230 recompiles the inputs to generate a new cloud platform specific detailed pipeline that deploys the versions of software releases according to the new artifact version map.

Figure 4:
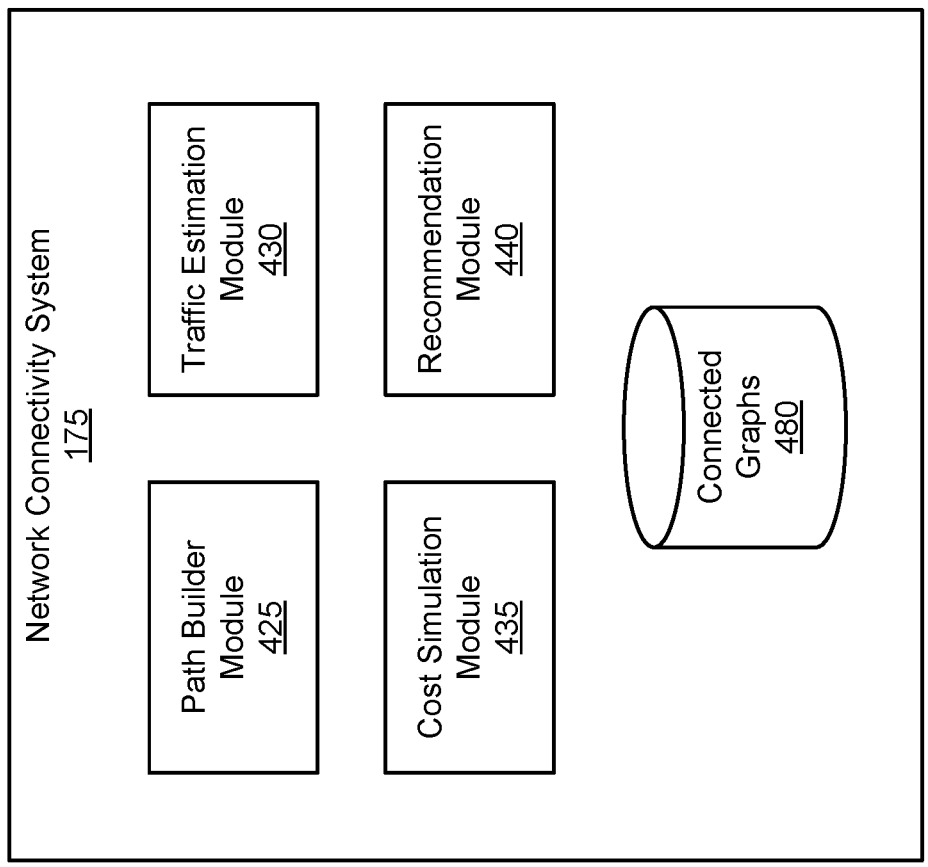
FIG. 4 is a block diagram illustrating a system architecture of a network connectivity module 130 of the multi-tenant system, according to an embodiment.

FIG. 4 is a block diagram illustrating a system architecture of a network connectivity system 175 of the multitenant system, according to an embodiment. In one embodiment, the network connectivity system 175 includes a path builder module 425, a traffic estimation module 430, a cost simulation module 435, and a recommendation module 440. The network connectivity system 175 also includes a connectivity graphs store 480. Other embodiments can have different and/or other components than the ones described here, and that the functionalities can be distributed among the components in a different manner.

The path builder module 425 manages connectivity information amongst different datacenter entities of the cloud platform 120. In one embodiment, the path builder module 425 manages connectivity information amongst different service group instances that are each a group of related services. In one instance, the service instances within a service group are associated with the same Layer 2 (L2) domain, where service instances within the domain can communicate with each other over a flat network without routing. A machine within the domain would have a private IP address from, for example, RFC 1918 and be connected to other machines through L2 gateways.

The network connectivity information indicates possible connection routes between service groups and thus, between the services that are included within respective service groups. Thus, the network connectivity information may indicate multiple connectivity paths between a first service group instance and a second service group instance. In one embodiment, the network connectivity information is represented as a connected graph, where the nodes of the connected graph represent different service groups that are connected to each other via multiple edges, where an edge is associated with a respective connectivity mechanism. The path builder module 425 stores connected graphs in the connected graphs datastore 480.

In one embodiment, the path builder module 425 obtains network connectivity information from the declarative specifications datastore, the security-as-code datastore, and the derived and hydrated specifications datastores described in conjunction with the deployment system in FIG. 2. Through the information contained in the datastores, the path builder module 425 can identify connectivity mechanisms between datacenter entities that are consistent with security policies and communication protocols for the datacenter entities as specified in declarative specifications and comply with the configurations and network policies specified by network services.

In one instance, a connectivity mechanism for connecting a particular set of services or service groups may be present by default as a universal connectivity mechanism, such as connections through the Internet. In one instance, a certain connectivity mechanism may not be available because of the underlying infrastructure of the cloud platform 120, because of restrictions due to geographical regions, and the like. In one instance, a certain connectivity mechanism may not be available because the team for the dedicated service have not yet enabled that feature.

Figure 5:
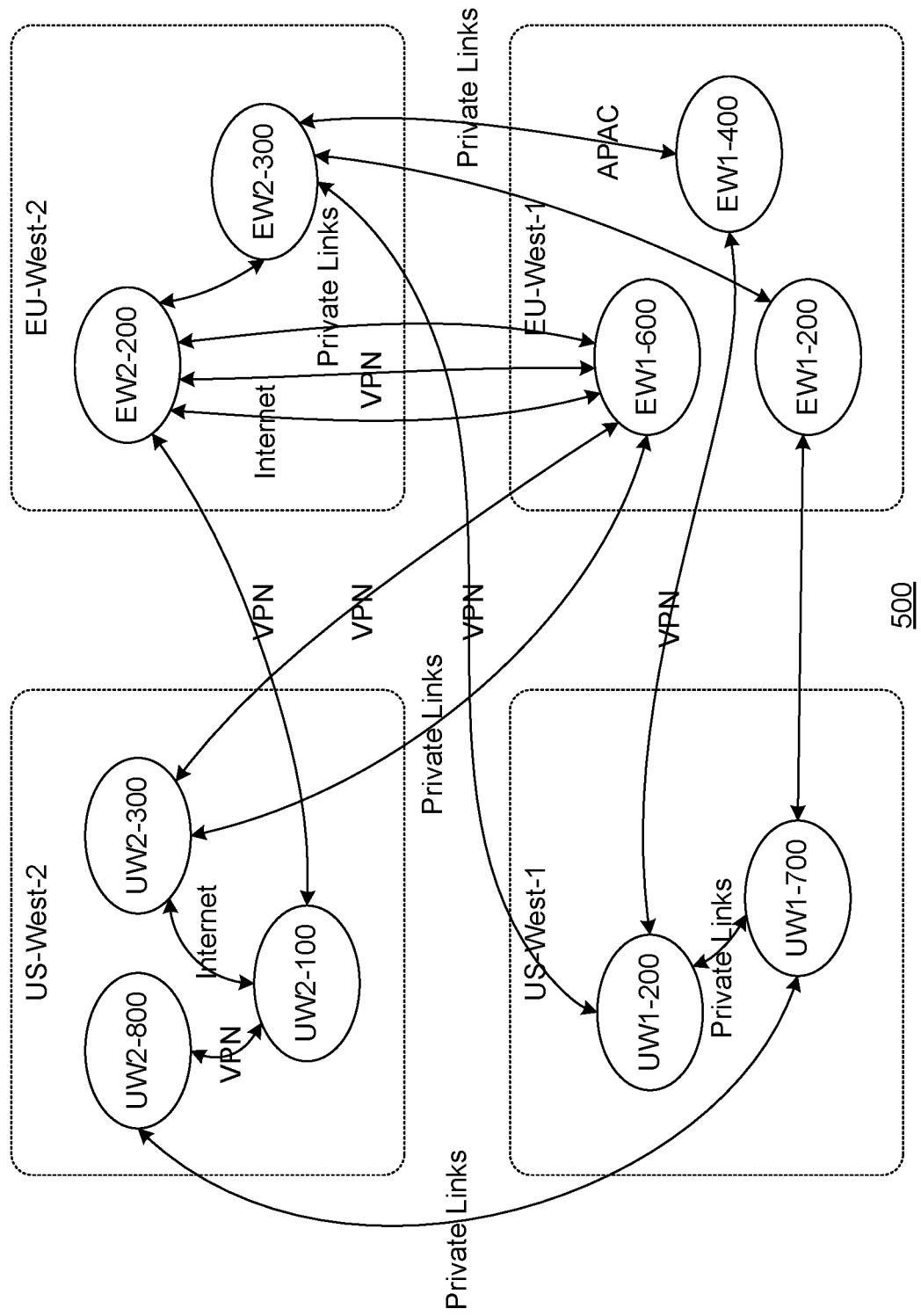
FIG. 5 illustrates an example network connectivity graph generated by the path builder module, according to an embodiment.

FIG. 5 illustrates an example network connected graph 500 generated by the path builder module 425, according to an embodiment. The example connected graph 500 illustrates service groups within each of four datacenters, US-West-1, US-West-2, EU-West-1, and EU-West-2. Specifically, the US-West-1 datacenter includes service group instances identified by UW1-200 and UW1-700. The US-West 2 datacenter includes service group instances UW2-800, UW2-300, and UW2-100. The EU-West-1 datacenter includes service group instances EW1-600, EW1-200, and EW1-400. The EU-West-2 datacenter includes service group instances EW2-200 and EW2-300. Each node in the connected graph corresponds to a respective service group instance and edges between a pair of service groups may represent a respective connectivity mechanism that can be used to connect a service in one service group to another service in the other service group.

For example, a connection can be established between the service group UW2-300 in datacenter US-West-2 and the service group EW1-600 in datacenter EU-West-1 via a first route through cloud-specific tunnel such as PrivateLink and a second route via a VPN connection. As another example, a connection can be established between the service group EW2-200 in the datacenter EU-West-2 and the service group EW1-600 in datacenter EU-West-1 via a first route through PrivateLink and a second route through the Internet (for example, forward proxy), and a third route through VPN. Thus, for a particular set of service groups, the connected graph indicates the multiple routes available for connecting one service group to another. While an embodiment in which each node represents a service group instance is illustrated for the sake of description, it is appreciated that in other embodiments, the path builder module 425 may generate the network connectivity information with respect to other types of datacenter entities, such as different services, datacenters, and the like.

Returning to FIG. 4, responsive to the network connectivity system 175 receiving a request to provide recommended routes between a particular set of datacenter entities, the cost simulation module 435 generates cost estimates for connectivity mechanisms between the particular set of entities based on a combination of a set of factors. In one embodiment, one factor is an estimate for network traffic that estimates the amount of data that flows through the connection for a given period of time. In one instance, the cost estimate may not be a fixed cost and may depend on traffic flowing through the system in both the ingress and egress directions as a function of time.

In one embodiment, the cost estimate depending on the traffic flow may be obtained directly from cost sheets from a provider of the cloud platform 120. For example, a particular cloud platform provider may charge a connectivity mechanism through a NAT Gateway hourly, at the rate of $0.045 per hour. Moreover, the cloud platform provider may also have a data processing charge for every 1 GB of data that goes through the NAT gateway, at a rate of $0.045 per 1 GB. The cost estimates for other types of connectivity mechanisms, such as platform-specific tunnels (e.g., PrivateLink) or VPN connections, might have similar cost estimates that depend on traffic flow estimates through the connections. The estimated traffic flow between two datacenter entities for a connectivity mechanism may be provided by the traffic estimation module 430.

In another embodiment, another factor are standup costs associated with the service. In some instances, this is a one-time cost component and may not be impacted by the amount of data the connectivity mechanism is processing. In some instances, the standup cost may be charged per period of time, e.g., hourly. For example, in the example of the NAT Gateway, the particular cloud platform provider may charge $0.045 per hour of use that applies once the NAT Gateway is provisioned and available. In other instances, the standup costs may be charged as a standalone charge, regardless of the time the connection is used.

In another embodiment, one factor is the cost to serve. Specifically, in some instances, the underlying networking services may be offered by the cloud platform provider and be directly consumed by the user and the provider will deploy and manage these networking mechanisms as part of the service deployment. In such an instance, the cost estimate for a connectivity mechanism may depend on the traffic flow estimate and the standup cost. However, often times, a large-scale entity such as the multi-tenant system 110 builds various levels of abstractions on top of networking services which are agnostic to the underlying cloud platform. For example, such abstractions may be built by network services 225 described in conjunction with the deployment system 170 that include a dedicated service for each type of connectivity mechanism. For such services, there may be an operational cost that is incurred for building these abstractions and managing them. In one embodiment, one or more services of the network services 225 may maintain a cost and usage model on how users of these services are consuming these services and how the use adds to the operating cost of the service.

As an example, for a connectivity mechanism using PrivateLink to connect a service instance to another service instance in another service group, the cost estimate may be:

730 hours per month ×$0.011=$8.03, which is an hourly standup cost for endpoint network interface (ENI), 1 GB per moth ×$0.01=$0.01, which is the data processing cost per 1 GB, thus, $8.03+$0.01=$8.04 is the sum of hourly standup cost and data processing cost per ENI, 1 VPC endpoints ×3 ENI's per VPC endpoint ×$8.04=$24.12, thus, the total Private Links cost per month =$24.12.

As another example, for a connectivity mechanism using NAT Gateways, the cost estimate may be:

730 hours per month ×$0.045=$32.85, which is an hourly standup cost for NAT Gateway usage, 1 GB per month ×$0.045=$0.045, which is the data processing cost per 1 GB, thus, $32.850+$0.045 USD=$32.85 is the sum of hourly standup cost and data processing cost, 3 NAT Gateways ×$32.90=$98.7, thus, the total NAT Gateway cost per month is $98.7.

The traffic estimation module 430 estimates the traffic flow between two datacenter entities that are generated when the two entities are communicating with each other. For example, the traffic flow estimate can be provided to the cost simulation module 435, such that the traffic flow estimate can be used to simulate the cost estimate for a connectivity mechanism. In one embodiment, the traffic flow is an estimation that is part of, for example, capacity planning and may be provided as a value from user input (e.g., from an operator of a network service). This method may be applicable to, for example, greenfield deployment scenarios. The value may be provided, for example, through an API. In one instance, a service may be deployed in a datacenter and data to estimate the traffic flow may be obtained from the data stored in the datacenter.

In another embodiment, in a brownfield deployment scenario, the traffic flow estimate may be generated by analysis of the network traffic data generated during the real-time usage of the network service. For example, the multi-tenant system 110 may store in a data lake, details for obtaining better observability for the network or applications that are collected and stored from various subsystems. The multi-tenant system 110 may provide a model, such as an artificial intelligence (AI) or machine-learning (ML) model to generate intelligence on top of the data collected from the various subsystems to estimate the traffic flow between the two datacenter entities. For example, the data may be collected by an API that is invoked periodically in a repeated manner. The API may provide different parameters to provide details of the traffic flow estimation for a given service for a given period.

In both types of deployment, the data collected may indicate how much network traffic a service would be generating or is already generating in the ingress direction, the egress direction, or a combination of both. In one embodiment, the traffic flow estimate is primarily based on the egress data that represents the network connection originated from this service. However, embodiments are not limited hereto, and the return traffic for the same connection can be incorporated into the traffic flow. In one embodiment, the dedicated team for a network service (e.g., team managing public proxy, team managing VPN, etc.) may store an articulation of data that is indicative of existing traffic flow between datacenter entities.

The recommendation module 440 receives requests from a datacenter entity (e.g., service) to provide a recommendation for one or more connectivity mechanisms to another entity (e.g., another service). Given a request, the recommendation module 440 obtains a set of possible connectivity mechanisms from the network connectivity information (e.g., connected graphs) generated by the path builder module 425. The recommendation system 440 requests cost estimates for the connectivity mechanisms from the cost simulation module 435. For example, the cost estimates for a respective connectivity mechanism may be generated based on the traffic flow estimate between the datacenter entities generated by the traffic estimation module 430.

In one embodiment, the recommendation module 440 as a part of the request, obtains one or more parameters for the connectivity request. The one or more parameters may include the details of the datacenter entity (e.g., details of the service requesting the connection), outbound access indicating the address (e.g., URL) of the other entity to which the requesting datacenter entity requests connectivity to, or traffic flow estimations that indicate estimated network traffic usage by the requesting datacenter entity (that may be provided by the traffic estimation module 430). The one or more parameters may also include requirements for a set of key indicators, including a latency requirement, a cost requirement, and/or a security requirement of the recommended connectivity mechanisms that may be specified in the request.

In one embodiment, the recommendation module 440 identifies one or more possible connectivity mechanisms for the requesting service and presents the identified connectivity mechanisms with details on the cost estimates, latency, and security related to each connectivity mechanism. In this manner, a service owner of the service requesting the connection can make a judgement to select a connectivity mechanism based on the details of the input parameters.

In another embodiment, subject to one or more requirements specified in the request with respect to the indicators, the recommendation module 440 may select a connectivity mechanism for the requesting service by optimizing over requirements for the indicators specified in the request. In one instance, the recommendation module 440 generates a decision tree that can be traversed to determine a connectivity mechanism that satisfies the requirements for the indicators and may be suitable for the requesting service. The decision tree may have a hierarchy of nodes, in which a node may correspond to a criteria for a parameter or a combination of parameters, and the node may have two or more child nodes depending on whether the requirements for the one or more parameters satisfy the criteria or not. The leaf nodes may correspond to different connectivity mechanism candidates, and the recommendation module 440 may traverse the decision tree based on the received requirements for the request and recommend a connectivity mechanism after traversing the tree.

In this manner, the requesting service may specify any requirements that are important for establishing the connection to the other service. The recommendation module 440 may then provide one or more selected connectivity mechanisms that comply with the requirements specified in the request. For example, the requesting service may also designate the relative importance between different parameters in the request, such that the recommended connectivity mechanism incorporates requirements for one indicator (e.g., latency) with higher importance than requirements for another indicator (e.g., security).

Specifically, there may be a large number of services deployed on the cloud platform 120 that perform different functionalities. A service may have a respective set of requirements when connecting to another service on the cloud platform 120, some of which have higher relative importance than others. For example, a first service instance requesting connectivity to a second service instance may value the most secure connectivity mechanism over a connectivity mechanism that is less secure but more cost-effective. Thus, the recommendation module 440 may determine that a VPN connection may be optimal for the first service instance over other connectivity mechanisms (e.g., public proxy) if the VPN connection is more secure, even though there may be an added cost and latency for using the VPN connection. As another example, the recommendation module 440 may determine that two or more connectivity mechanisms have a similar level of security requirements. For example, a VPN connection may have similar security requirements as a PrivateLink connection for a connection between the first service and the second service, and thus, the recommendation module 440 may recommend the more cost-effective connectivity mechanism for the request.

In this manner, the recommendation module 440 can coordinate with modules of the network connectivity system 175 to automatically determine a set of possible paths to connect one datacenter entity to another datacenter entity. Moreover, the recommendation module 440 can provide recommended connectivity mechanisms that are tailored to the needs of the particular entity of the request, with respect to indicators such as cost, latency, security, as well as traffic flow. Moreover, as modules of the network connectivity system 175 can repeatedly update the network connectivity information as datacenter entities and network services are modified on the cloud platform 120, the recommendation module 440 is able to recommended connectivity mechanisms that are up-to-date with these changes.

CONFIGURATION OF CLOUD INFRASTRUCTURE WITH CONNECTIVITY MECHANISM RECOMMENDATIONS

Figure 6:
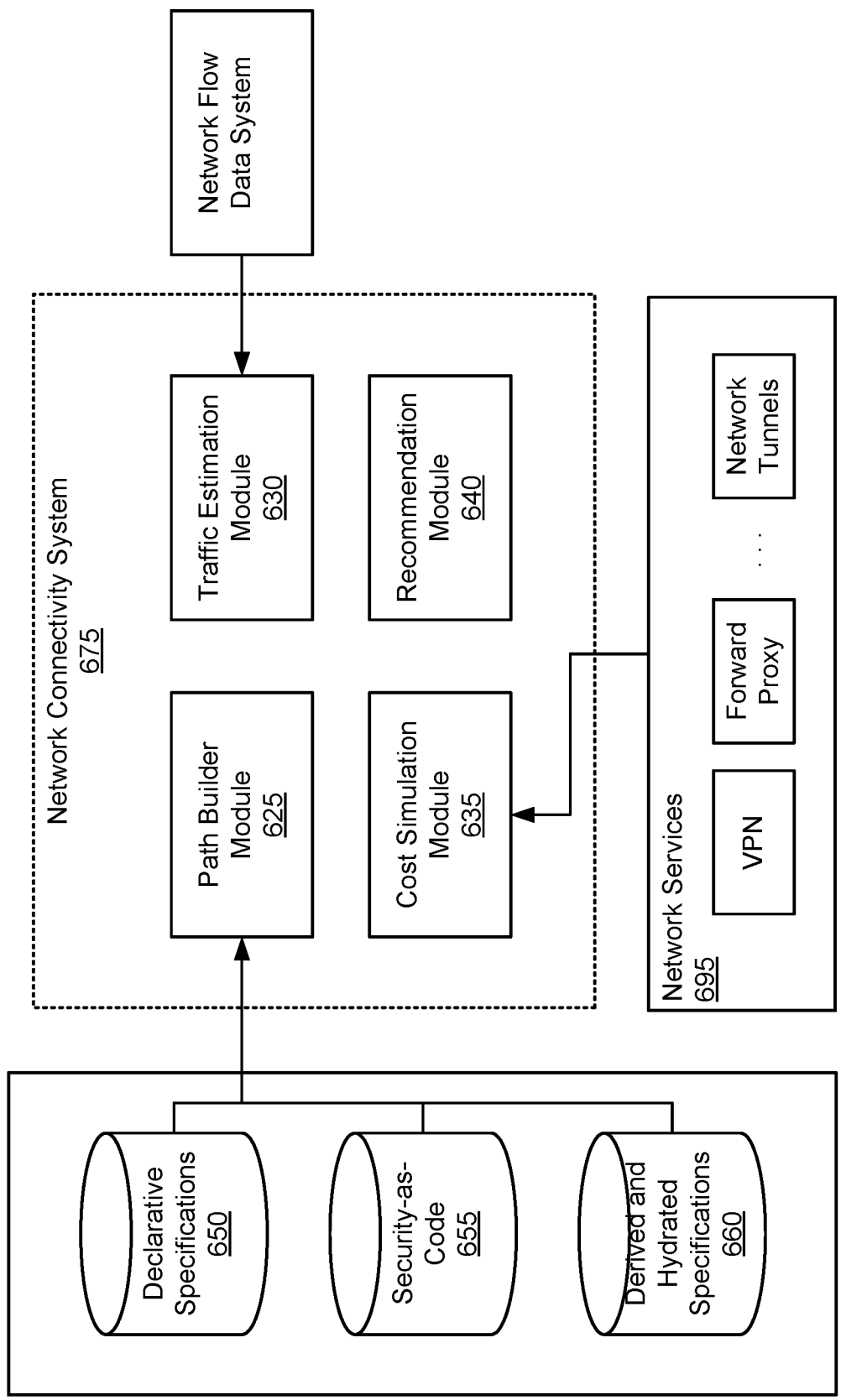
FIG. 6 illustrates an overall configuration of a cloud infrastructure with network connectivity recommendations, according to an embodiment.

FIG. 6 illustrates an overall configuration of a cloud infrastructure with network connectivity recommendations, according to an embodiment. As illustrated in FIG. 6, the cloud infrastructure presented herein includes a network connectivity system 675 in communication with network services 695. The network connectivity system 675 may be substantially similar or identical to the functionality of the network connectivity system 175 described in conjunction with FIG. 4. The network services 695 may be substantially similar or identical to the functionality of the network services 225 described in conjunction with the deployment system 170 of FIG. 2.

The path builder module 625 of the network connectivity system 675 generates network connectivity information that indicates possible routes for connection between datacenter entities. In one embodiment, the path builder module 625 may obtain information stored in the declarative specification store 650, the security-as-code datastore 655, and the derived and hydrated specifications datastore 660 to generate the network connectivity information. In one instance, the network connectivity information can be represented as a connected graph.

The cost simulation module 635 generates cost estimates for each of the identified connectivity mechanisms between the first datacenter entity and the second datacenter entity. In one instance, the cost estimate for a connectivity mechanism may be dependent on the estimated traffic flow, standup costs for setting up the connection, or cost to serve. In one instance, the cost simulation module 635 may estimate the cost for a connectivity mechanism based on cost and usage models that are managed by dedicated network services that service a respective type of connectivity mechanism. For example, in the cloud infrastructure of FIG. 6, the network services 695 include dedicated services for VPN services, forward proxy services, and network tunnel services that provides information from cost and usage models to the cost simulation module 635.

The traffic estimation module 630 receives estimates for traffic flow for a connectivity mechanism or may analyze historical traffic data to estimate traffic flow between two datacenter entities. In one instance, the traffic estimation module 630 receives data form various network flow data systems that track traffic between datacenter entities deployed on the cloud platform 120.

The recommendation module 640 receives a request to provide recommended connectivity mechanisms between a first datacenter entity and a second datacenter entity. The request may further specify requirements with respect to one or more indicators, such as a security requirement, a latency requirement, or a cost requirement. In one instance, the recommendation module 640 may traverse a decision tree to arrive at a connectivity mechanism for recommendation for the request that complies with the requirements specified for the indicators.

Figure 7:
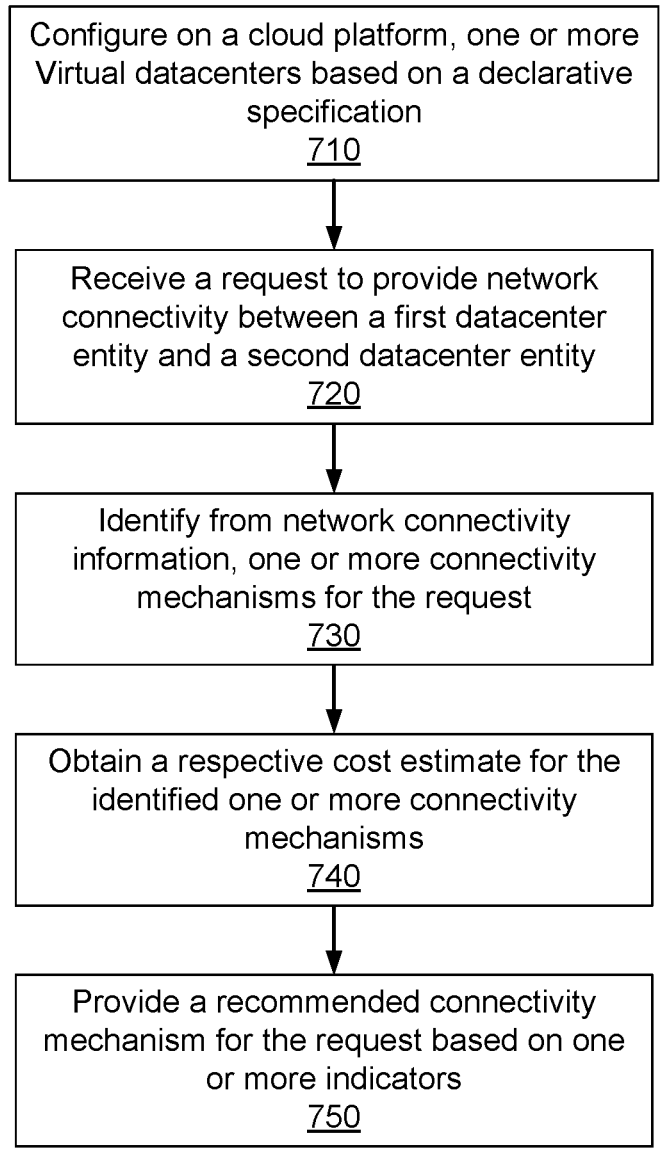
FIG. 7 illustrates a flowchart for a method for providing network connectivity recommendations, according to an embodiment.

FIG. 7 illustrates a flowchart for a method for providing network connectivity recommendations, according to an embodiment. In one embodiment, the method illustrated in FIG. 7 is performed by various components of the cloud infrastructure described herein.

An online system configures 710 on a cloud platform, one or more virtual datacenters based on a declarative specification specifying a hierarchy of datacenter entities. The online system receives 720 a request to provide network connectivity between a first virtual datacenter entity to a second virtual datacenter entity. The online system identifies 730 from network connectivity information, one or more connectivity mechanisms for establishing connectivity between the first virtual datacenter entity and the second virtual datacenter entity. The online system obtains 740 a respective cost estimate for the identified one or more connectivity mechanisms, wherein a cost estimate for a connectivity mechanism indicates a cost estimate for using the respective connectivity mechanism between the first datacenter entity and the second datacenter entity. The online system provides 750 a recommended connectivity mechanism for the request based on one or more indicators, wherein the one or more indicators include at least the cost estimates for the identified one or more connectivity mechanisms.

COMPUTER ARCHITECTURE

Figure 8:
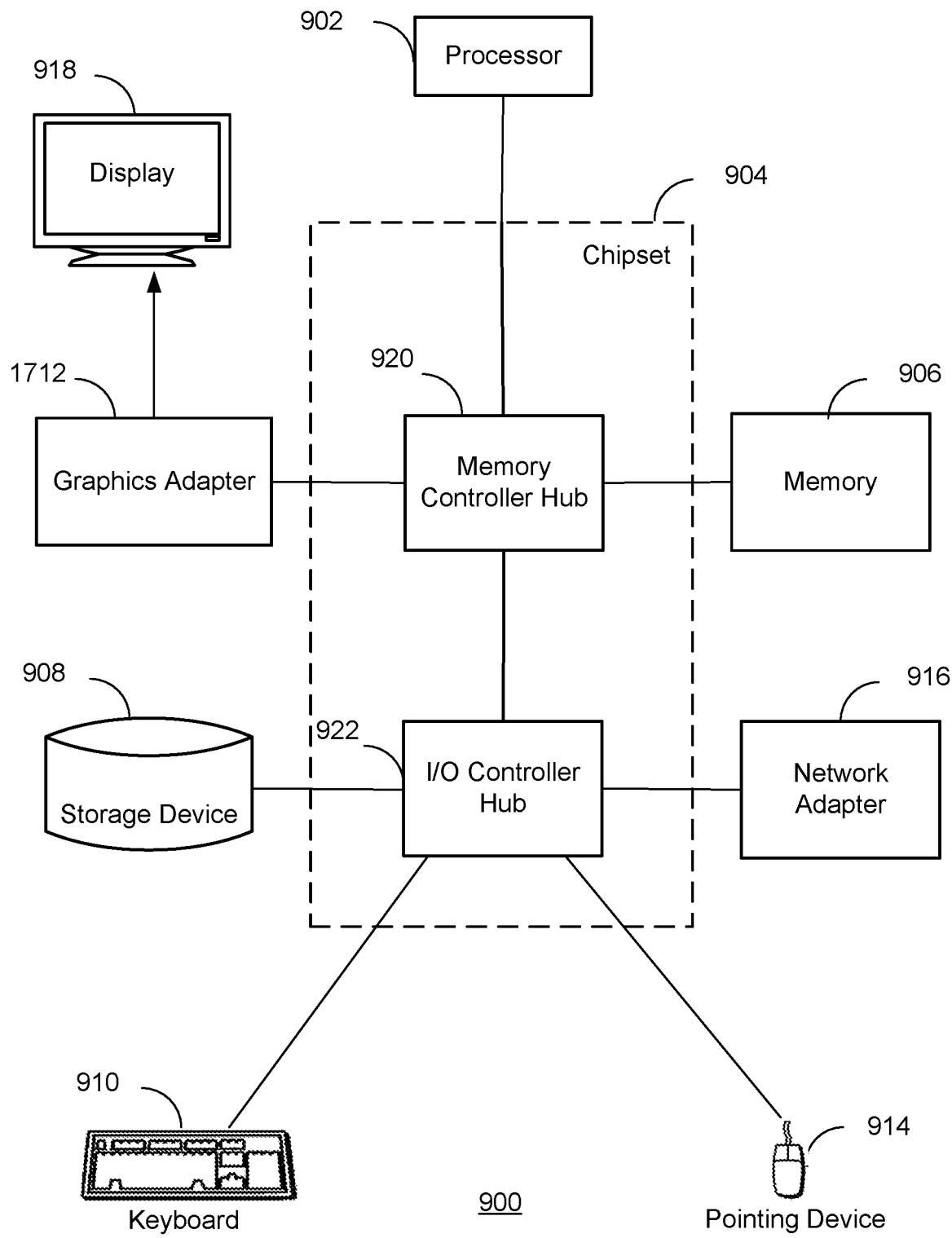
FIG. 8 is a high-level block diagram illustrating a functional view of a typical computer system for use as one of the entities illustrated in the environment of FIG. 1 according to an embodiment.

FIG. 8 is a high-level block diagram illustrating a functional view of a typical computer system for use as one of the entities illustrated in the environment 100 of FIG. 1 according to an embodiment. Illustrated are at least one processor 902 coupled to a chipset 904. Also coupled to the chipset 904 are a memory 906, a storage device 908, a keyboard 910, a graphics adapter 912, a pointing device 914, and a network adapter 916. A display 918 is coupled to the graphics adapter 912. In one embodiment, the functionality of the chipset 904 is provided by a memory controller hub 920 and an I/O controller hub 922. In another embodiment, the memory 906 is coupled directly to the processor 902 instead of the chipset 904.

The storage device 908 is a non-transitory computer-readable storage medium, such as a hard drive, compact disk read-only memory (CD-ROM), DVD, or a solid-state memory device. The memory 906 holds instructions and data used by the processor 902. The pointing device 914 may be a mouse, track ball, or other type of pointing device, and is used in combination with the keyboard 910 to input data into the computer system 900. The graphics adapter 912 displays images and other information on the display 918. The network adapter 916 couples the computer system 900 to a network.

As is known in the art, a computer 900 can have different and/or other components than those shown in FIG. 9. In addition, the computer 900 can lack certain illustrated components. For example, a computer system 900 acting as a multi-tenant system 110 may lack a keyboard 910 and a pointing device 914. Moreover, the storage device 908 can be local and/or remote from the computer 900 (such as embodied within a storage area network (SAN)).

The computer 900 is adapted to execute computer modules for providing the functionality described herein. As used herein, the term "module" refers to computer program instruction and other logic for providing a specified functionality. A module can be implemented in hardware, firmware, and/or software. A module can include one or more processes, and/or be provided by only part of a process. A module is typically stored on the storage device 908, loaded into the memory 906, and executed by the processor 902.

The types of computer systems 900 used by the entities of a system environment can vary depending upon the embodiment and the processing power used by the entity. For example, a client device may be a mobile phone with limited processing power, a small display 918, and may lack a pointing device 914. A multi-tenant system or a cloud platform, in contrast, may comprise multiple blade servers working together to provide the functionality described herein.

ADDITIONAL CONSIDERATIONS

The particular naming of the components, capitalization of terms, the attributes, data structures, or any other programming or structural aspect is not mandatory or significant, and the mechanisms that implement the embodiments described may have different names, formats, or protocols. Further, the systems may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain embodiments described herein include process steps and instructions described in the form of an algorithm. It should be noted that the process steps and instructions of the embodiments could be embodied in software, firmware or hardware, and when embodied in software, could be downloaded to reside on and be operated from different platforms used by real time network operating systems.

The embodiments described also relate to apparatuses for performing the operations herein. An apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present embodiments are not described with reference to any particular programming language. It is appreciated that a variety of programming languages may be used to implement the teachings of the embodiments as described herein.

The embodiments are well suited for a wide variety of computer network systems over numerous topologies. Within this field, the configuration and management of large networks comprise storage devices and computers that are communicatively coupled to dissimilar computers and storage devices over a network, such as the Internet. Finally, it should be noted that the language used in the specification has been principally selected for readability and instructional purposes and may not have been selected to delineate or circumscribe the inventive subject matter. Accordingly, the disclosure of the embodiments is intended to be illustrative, but not limiting.

What is claimed is:
1. A computer implemented method comprising:
configuring on a cloud platform, one or more virtual datacenters based on a declarative specification specifying a hierarchy of virtual datacenter entities;
identifying one or more connectivity mechanisms for establishing connectivity between a first virtual datacenter entity and a second virtual datacenter entity based on a connected graph where a node represents a service group instance on a virtual datacenter and an edge represents a connectivity mechanism for establishing a connection between service group instances represented by a pair of nodes;
obtaining a respective cost estimate for the one or more connectivity mechanisms, wherein a cost estimate for a connectivity mechanism indicates a cost estimate for using the connectivity mechanism between the first virtual datacenter entity and the second virtual datacenter entity;

traversing through a decision tree to arrive at a recommended connectivity mechanism based on one or more indicators comprising the cost estimates for the one or more connectivity mechanisms, wherein the one or more indicators specify a security requirement for a connectivity mechanism; and providing the recommended connectivity mechanism.

2. The computer implemented method of claim 1, wherein the first virtual datacenter entity is a first service instance and the second virtual datacenter entity is a second service instance.

3. The computer implemented method of claim 1, wherein the one or more connectivity mechanisms include one or more of a connection through a L3 router, a forward proxy, a virtual private network (VPN) connection, a cloud platform specific tunnel, or a CDN Edge server.

4. The computer implemented method of claim 1, wherein the one or more indicators also specify one or more of a latency requirement or a security requirement for a connectivity mechanism.

5. The computer implemented method of claim 1, wherein the cost estimate for the respective connectivity mechanism incorporates one or more of an estimated traffic flow between the first virtual datacenter entity and the second virtual datacenter entity, a standup cost for the connectivity mechanism, or a cost to serve for the connectivity mechanism.

6. A non-transitory computer readable storage medium for storing instructions that when executed by a computer processor cause the computer processor to perform steps for:

configuring on a cloud platform, one or more virtual datacenters based on a declarative specification specifying a hierarchy of virtual datacenter entities;

identifying one or more connectivity mechanisms for establishing connectivity between a first virtual datacenter entity and a second virtual datacenter entity based on a connected graph where a node represents a service group instance on a virtual datacenter and an edge represents a connectivity mechanism for establishing a connection between service group instances represented by a pair of nodes;

obtaining a respective cost estimate for the one or more connectivity mechanisms, wherein a cost estimate for a connectivity mechanism indicates a cost estimate for using the connectivity mechanism between the first virtual datacenter entity and the second virtual datacenter entity;

traversing through a decision tree to arrive at a recommended connectivity mechanism based on one or more indicators comprising the cost estimates for the one or more connectivity mechanisms, wherein the one or more indicators specify a security requirement for a connectivity mechanism; and providing the recommended connectivity mechanism.

7. The non-transitory computer readable storage medium of claim 6, wherein the first datacenter entity is a first service instance and the second datacenter entity is a second service instance.

8. The non-transitory computer readable storage medium of claim 6, wherein the one or more connectivity mechanisms include one or more of a connection through a L3 router, a forward proxy, a virtual private network (VPN) connection, a cloud platform specific tunnel, or a CDN Edge server.

9. The non-transitory computer readable storage medium of claim 6, wherein the one or more indicators also specify one or more of a latency requirement or a security requirement for a connectivity mechanism.

10. The non-transitory computer readable storage medium of claim 6, wherein the cost estimate for the respective connectivity mechanism incorporates one or more of an estimated traffic flow between the first virtual datacenter entity and the second virtual datacenter entity, a standup cost for the connectivity mechanism, or a cost to serve for the connectivity mechanism.

11. A computer system, comprising:

one or more computer processors; and a non-transitory computer-readable storage medium for storing instructions that when executed by the one or more computer processors cause the one or more computer processors to perform steps comprising:

configuring on a cloud platform, one or more virtual datacenters based on a declarative specification specifying a hierarchy of virtual datacenter entities;

identifying one or more connectivity mechanisms for establishing connectivity between a first virtual datacenter entity and a second virtual datacenter entity based on a connected graph where a node represents a service group instance on a virtual datacenter and an edge represents a connectivity mechanism for establishing a connection between service group instances represented by a pair of nodes;

obtaining a respective cost estimate for the one or more connectivity mechanisms, wherein a cost estimate for a connectivity mechanism indicates a cost estimate for using the connectivity mechanism between the first virtual datacenter entity and the second virtual datacenter entity;

traversing through a decision tree to arrive at a recommended connectivity mechanism based on one or more indicators comprising the cost estimates for the one or more connectivity mechanisms, wherein the one or more indicators specify a security requirement for a connectivity mechanism; and providing the recommended connectivity mechanism.

12. The system of claim 11, wherein the first virtual datacenter entity is a first service instance and the second virtual datacenter entity is a second service instance.

13. The system of claim 11, wherein the one or more connectivity mechanisms include one or more of a connection through a L3 router, a forward proxy, a virtual private network (VPN) connection, a cloud platform specific tunnel, or a CDN Edge server.

14. The system of claim 11, wherein the one or more indicators also specify one or more of a latency requirement or a security requirement for a connectivity mechanism.

15. The system of claim 11, wherein the cost estimate for the respective connectivity mechanism incorporates one or more of an estimated traffic flow between the first virtual datacenter entity and the second virtual datacenter entity, a standup cost for the connectivity mechanism, or a cost to serve for the connectivity mechanism.

* * * * *